(12) United States Patent
Yui (10) Patent No.: US 9,181,678 B2
(45) Date of Patent: Nov. 10, 2015

(54) BACKHOE LOADER

(75) Inventor: Daichi Yui, Komatsu (JP)

(73) Assignee: KOMATSU LTD., Tokyo (JP)

( * ) Notice: Subject to any disclaimer, the term of this patent is extended or adjusted under 35 U.S.C. 154(b) by 467 days.

(21) Appl. No.: 13/634,002

(22) PCT Filed: May 21, 2012

(86) PCT No.: PCT/JP2012/062895
§ 371 (c)(1),
(2), (4) Date: Sep. 11, 2012

(87) PCT Pub. No.: WO2013/132669
PCT Pub. Date: Sep. 12, 2013

(65) Prior Publication Data
US 2013/0236280 A1    Sep. 12, 2013

(30) Foreign Application Priority Data
Mar. 9, 2012  (JP) .................. 2012-053213

(51) Int. Cl.
*B60R 3/02* (2006.01)
*E02F 3/96* (2006.01)
*B60R 3/00* (2006.01)
*E02F 9/08* (2006.01)

(52) U.S. Cl.
CPC ............... *E02F 3/964* (2013.01); *B60R 3/002* (2013.01); *E02F 9/0833* (2013.01)

(58) Field of Classification Search
CPC ........... B60N 3/06; B60N 3/063; B60R 3/00; B60R 3/002; B60R 3/02; B60R 3/04; B62D 21/18; B62D 21/186; E02F 9/08; E02F 9/0833; E02F 9/16; E02F 9/24

USPC ........... 37/412, 416, 428, 431, 432, 435, 437, 37/441, 442, 444; 180/89.1, 89.11, 89.12, 180/90.6, 311; 280/163, 164.1, 164.2, 166, 280/169; 296/75; 414/565, 685
See application file for complete search history.

(56) References Cited

U.S. PATENT DOCUMENTS

| 3,986,503 | A  | * | 10/1976 | Le Guillon ..................... 182/89 |
| 4,626,163 | A  | * | 12/1986 | Link et al. ..................... 414/685 |
| 5,078,568 | A  | * | 1/1992  | Lynnes ......................... 414/680 |
| D435,503  | S  | * | 12/2000 | Gukeisen et al. ............ D12/218 |
| D438,877  | S  | * | 3/2001  | Gukeisen et al. ............ D15/28 |
| 6,643,577 | B1 |   | 11/2003 | Padgett et al. |
| 2003/0051931 | A1 | * | 3/2003 | Johansson et al. ........... 180/69.2 |

(Continued)

FOREIGN PATENT DOCUMENTS

| CN | 1989301 A   | 6/2007 |
| CN | 101548048 A | 9/2009 |

(Continued)

*Primary Examiner* — Saul Rodriguez
*Assistant Examiner* — Brendan Tighe
(74) *Attorney, Agent, or Firm* — Drinker Biddle & Reath LLP (57) ABSTRACT

A backhoe loader includes cab, a loader, an engine, and a backhoe. The loader includes a pair of loader arms sandwiching the engine from the side, a loader bucket, and a loader bucket cylinder. There is provided a foot mount member attached at the outer side of the loader arm to be horizontal relative to the ground in a state where the bottom of the loader bucket is in contact with the ground. Thus, a backhoe loader of favorable workability in the maintenance service of engine can be obtained.

7 Claims, 10 Drawing Sheets

(56) References Cited

U.S. PATENT DOCUMENTS

| | | | |
|---|---|---|---|
| 2004/0017057 A1* | 1/2004 | Dunford | 280/163 |
| 2007/0217899 A1 | 9/2007 | Sakada | |
| 2010/0098522 A1 | 4/2010 | Shioji et al. | |
| 2010/0300778 A1 | 12/2010 | Miyazaki et al. | |
| 2014/0217700 A1* | 8/2014 | Ushikubo et al. | 280/415.1 |

FOREIGN PATENT DOCUMENTS

| | | |
|---|---|---|
| CN | 201485886 U | 5/2010 |
| CN | 201856708 U | 6/2011 |
| JP | 4-360602 A | 12/1992 |
| JP | 6-128982 A | 5/1994 |
| JP | 7-20350 U | 4/1995 |
| JP | H07-257281 A | 10/1995 |
| JP | 9-165797 A | 6/1997 |
| JP | 10-1976 A | 1/1998 |
| JP | 2000-257115 A | 9/2000 |
| JP | 2000-291069 A | 10/2000 |
| JP | 2001-98583 A | 4/2001 |
| JP | 2003-19923 A | 1/2003 |
| JP | 2006-77495 | 3/2006 |
| JP | 4198463 B | 12/2008 |
| JP | 2009-196637 A | 9/2009 |
| JP | 2010-58615 A | 3/2010 |
| JP | 2010-281042 A | 12/2010 |
| WO | WO 02/49899 A2 | 6/2002 |

* cited by examiner

BACKHOE LOADER

TECHNICAL FIELD

The present invention relates to backhoe loaders, particularly a backhoe loader including a loader arranged frontward of a cab and a backhoe arranged rearward of the cab.

BACKGROUND ART

A backhoe loader including a loader arranged frontward of a cab and a backhoe arranged rearward of the cab is disclosed in U.S. Pat. No. 6,643,577 (PTL 1), for example.

CITATION LIST

Patent Literature

PTL 1: U.S. Pat. No. 6,643,577

SUMMARY OF INVENTION

Technical Problem

The engine of the backhoe loader set forth above is sandwiched between the loader arms of the loader. Since access to the engine is disturbed by the loader arms, it is difficult to service the engine beyond the loader arms. Therefore, the engine must be serviced with the loader arms moved upwards. Under such circumstances, the engine must be started before the maintenance service in order to move the loader arms upwards. Thus, the job of servicing the engine is troublesome.

In view of the foregoing, an object of the present invention is to provide a backhoe loader that has favorable workability in servicing the engine.

Solution to Problem

A backhoe loader of the present invention includes a cab, a loader and an engine arranged frontward of the cab, and a backhoe arranged rearward of the cab. The loader includes a pair of loader arms sandwiching the engine from a side, a loader bucket provided at leading ends of the loader arms, and a loader bucket cylinder operating the loader bucket. At the outer side of the loader arm, a foot mount member is provided, attached to be horizontal relative to a ground in a state where the bottom of the loader bucket is in contact with the ground.

According to the backhoe loader of the present invention, the foot mount member is attached at the outer side of the loader arm to be horizontal relative to the ground in a state where the bottom of the loader bucket is in contact with the ground. Accordingly, the service worker can service the engine with the foot mount member as a foothold. It is therefore not necessary to start the engine prior to the maintenance service in order to move the loader arms upwards. Thus, the workability of servicing the engine is rendered favorable. Furthermore, the service worker is stable in posture since the service worker can place his/her foot horizontally on the foot mount member during engine servicing. Since the service worker can inspect the engine in a stable posture, the workability of servicing the engine is rendered favorable. The foot mount member is provided at at least one of the loader arms constituting a pair.

The backhoe loader set forth above includes a storage unit and a handle member. The storage unit juts out more sideward than the loader arm in plan view, and extends more frontward than the cab. The handle member is attached to the loader bucket cylinder so as to overlap with the foot mount member vertically in side view. Accordingly, the service worker can hold the handle member while servicing the engine with the storage unit and foot mount member as the foothold. Thus, the service worker can place one foot and the other foot on each of the storage unit and foot mount member, and also grasp the handle member with one hand, allowing the engine to be serviced under a stable state supported at three points.

The handle member is attached to the loader bucket cylinder so as to overlap with the foot mount member vertically in side view. Accordingly, the service worker can set the foot position and the hand position in an overlapping manner vertically in side view, such that the posture of the service worker is stabilized. Thus, the service worker can service the engine under a stable state.

In the backhoe loader set forth above, the foot mount member is located higher than the top face of the storage unit. Accordingly, the service worker can stand firmly by means of the foot mount member to stabilize his/her posture.

The backhoe loader set forth above further includes a fixture fastened to the loader arm, and having a pivot spindle. The foot mount member is supported by the fixture in a pivotable manner around the pivot spindle. Accordingly, the foot mount member can be pivoted around the pivot spindle. Thus, the area of the foot mount member protruding sideward during operation of the backhoe loader can be reduced.

In the backhoe loader set forth above, the storage unit includes a fuel tank. Therefore, the fuel tank can be taken as a foothold.

In the backhoe loader set forth above, the storage unit includes a hydraulic oil tank. Therefore, the hydraulic oil tank can be taken as the foothold.

In the backhoe loader set forth above, the storage unit includes a battery box. Therefore, the battery box can be taken as the foothold.

Advantageous Effects of Invention

According to the present invention set forth above, the workability of engine service is rendered favorable.

DESCRIPTION OF EMBODIMENTS

Embodiments of the present invention will be described hereinafter with reference to the drawings.

First, the structure of a backhoe loader according to an embodiment of the present invention will be described.

In the following, the terms "left", "right", "front" and "rear" indicate the direction faced by a service worker 100 sitting at an operator's seat 8 in a cab 2 with a steering handle 9 at the front as the reference.

Figure 1:
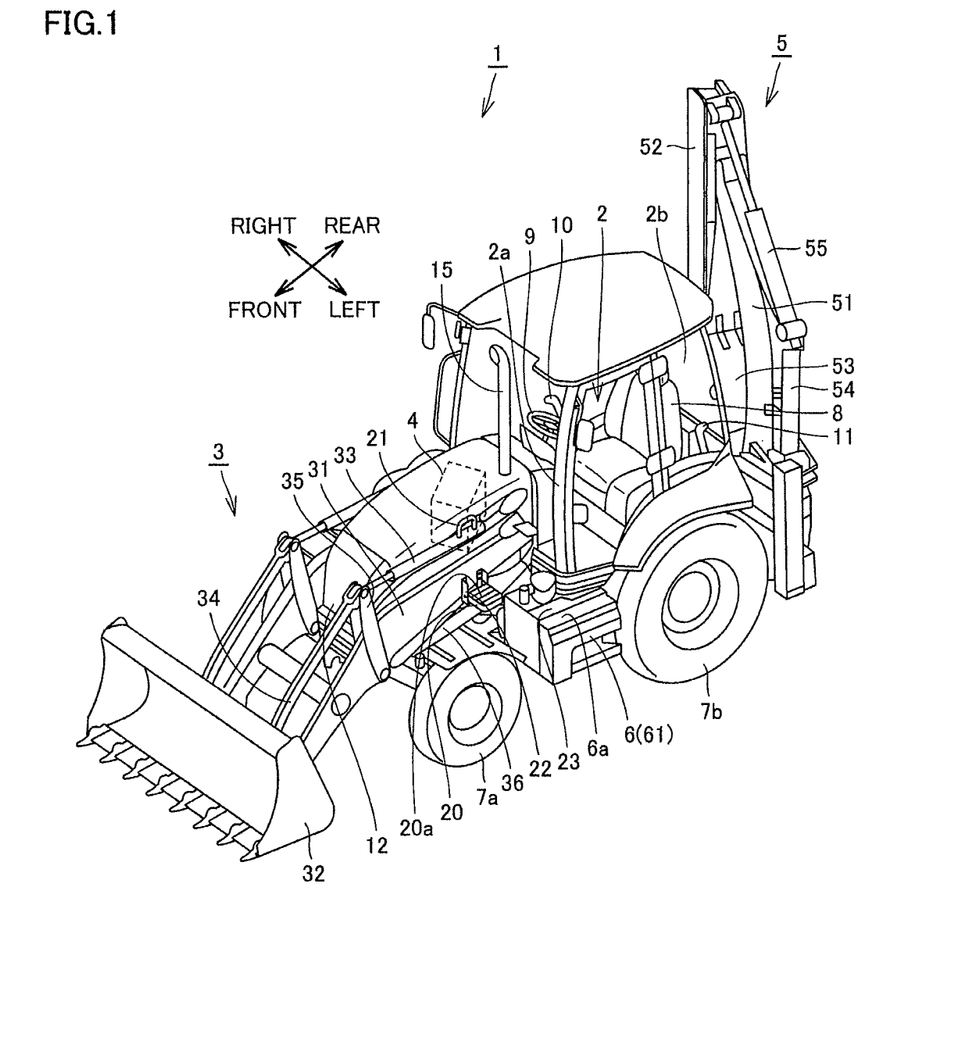
FIG. 1 is a perspective view schematically representing a configuration of a backhoe loader according to an embodiment of the present invention.
Figure 2:
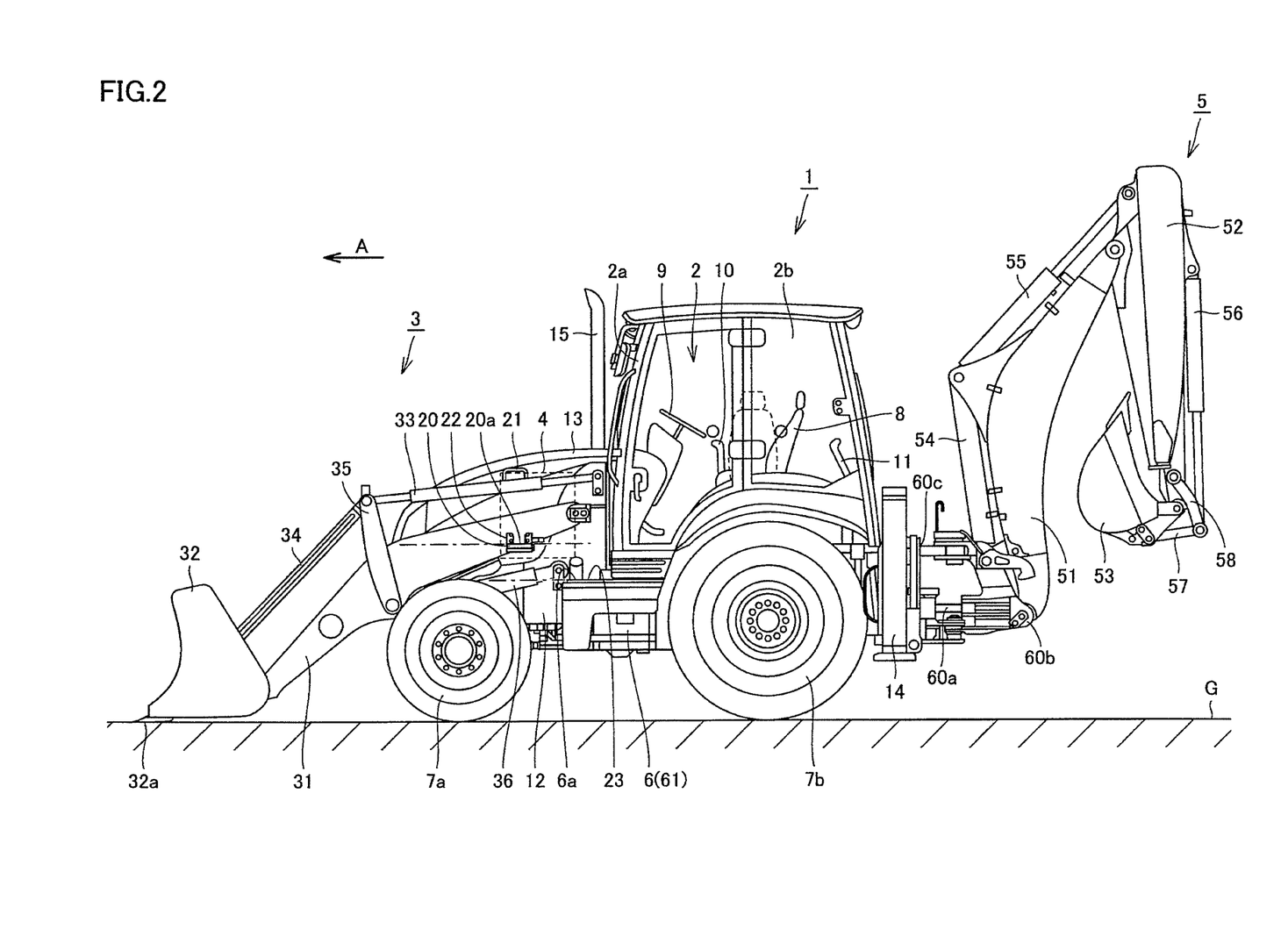
FIG. 2 is a left side view schematically representing a configuration of a backhoe loader according to an embodiment of the present invention.
Figure 3:
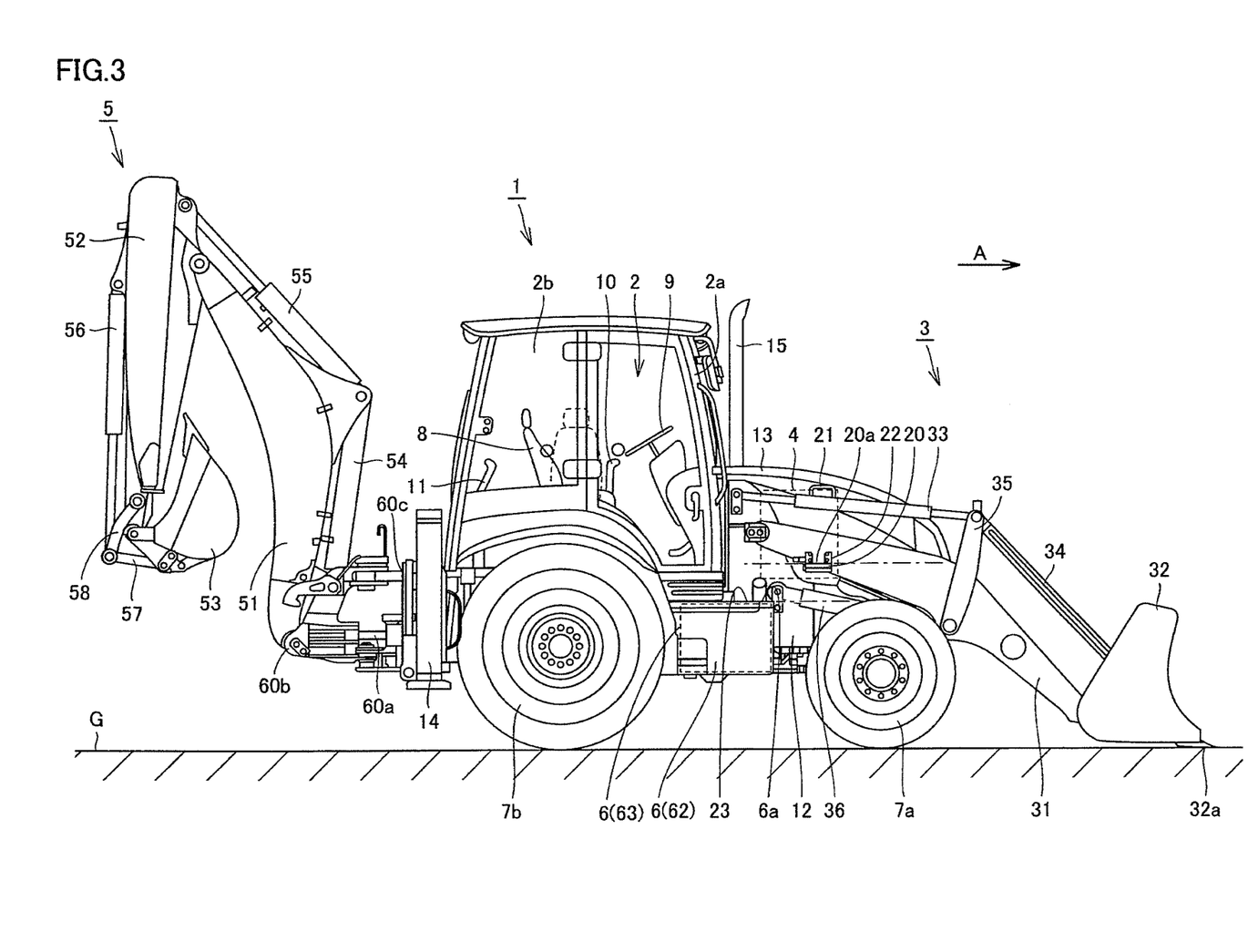
FIG. 3 is a right side view schematically representing a configuration of a backhoe loader according to an embodiment of the present invention.

Referring to FIGS. 1-3, a backhoe loader 1 of the present embodiment includes a cab 2, a loader 3, an engine 4, a backhoe 5, a storage unit 6, a front wheel 7a, a rear wheel 7b, an operator's seat 8, a steering handle 9, a loader lever 10, a backhoe lever 11, a frame 12, a bonnet 13, an outrigger 14, an exhaust pipe 15, a foot mount member 20, a handle member 21, a fixture 22 and an anti-skid member 23.

Cab 2 is located at the middle of backhoe loader 1. Cab 2 includes a frame member 2a and a glass window 2b fitted into frame member 2a. Loader 3 is arranged frontward of cab 2. The front side of cab 2 is the front side of the vehicle body (direction of arrow A in the drawing). Loader 3 includes a pair of loader arms 31, a loader bucket 32, a pair of loader bucket cylinders 33, a pair of loader rods 34, and a pair of loader tilt arms 35.

The pair of loader arms 31 has the base end swingably attached to frame 12. Loader bucket 32 is provided at the leading ends of loader arms 31 constituting a pair. Loader arms 31 and frame 12 are coupled by a pair of lift cylinders 36. The pair of loader arms 31 is configured to swing by lift cylinders 36 elongating and contracting.

Loader bucket 32 is swingably attached to the leading ends of paired loader arms 31. Loader bucket 32 and paired loader bucket cylinders 33 are coupled by paired loader rods 34. Loader bucket cylinders 33 are provided to operate loader bucket 32.

At the central region of loader 3, loader tilt arm 35 has its base end swingably supported by loader arm 31, and has its leading end swingably supported by loader bucket cylinder 33 and loader rod 34. Loader bucket 32 is configured to swing by loader bucket cylinders 33 elongating and contracting.

Engine 4 is arranged frontward of cab 2. Loader arms 31 constituting a pair of loaders 3 are provided to sandwich engine 4 from both sides. Engine 4 is mounted on frame 12, and covered with a bonnet 13 attached to frame 12.

Backhoe 5 is arranged rearward of cab 2. Backhoe 5 includes a boom 51, an arm 52, a backhoe bucket 53, a boom cylinder 54, an arm cylinder 55, a backhoe bucket cylinder 56, a backhoe rod 57, and a backhoe tilt arm 58.

Boom 51 has its base end swingably attached to a swing bracket 60b by swing cylinder 60a. Swing bracket 60b is attached to a slide bracket 60c. Slide bracket 60c is attached to frame 12. Arm 52 has its base end swingably attached to the leading end of boom 51. Backhoe bucket 53 is swingably attached to the leading end of arm 52. Boom 51 and frame 12 are coupled by boom cylinder 54. Boom 51 is configured to swing by boom cylinder 54 elongating and contracting. Boom 51 and arm 52 are coupled by arm cylinder 55. Arm 52 is configured to swing by arm cylinder 55 elongating and contracting.

Backhoe bucket cylinder 56 has its base end supported by arm 52 and has its leading end swingably supported by a first link 57 and a second link 58. Second link 58 is swingably supported by arm 52. First link 57 is swingably supported by backhoe bucket 53. Backhoe bucket 53 is configured to swing by backhoe bucket cylinder 56 elongating and contracting.

Storage unit 6 includes a fuel tank 61 and a battery box 62. Fuel tank 61 is arranged at the left side of backhoe loader 1. Fuel tank 61 is provided so as to allow storage of the fuel for backhoe loader 1. Fuel tank 61 juts out more sideward than loader arm 31. Fuel tank 61 extends more frontward than cab 2.

Battery box 62 is arranged at the right side of backhoe loader 1. Battery box 62 is provided so as to allow storage of the battery for backhoe loader 1. Battery box 62 juts out more sideward than loader aun 31. Battery box 62 extends more forward than cab 2. Fuel tank 61 and battery box 62 each constitute a step to get on/off cab 2.

At the left and right sides, backhoe loader 1 has a front wheel 7a attached at the front side and a rear wheel 7b attached at the rear side. At the internal space of cab 2 surrounded by frame member 2a and glass window 2b are arranged operator's seat 8, steering handle 9, loader lever 10 and backhoe lever 11.

Operator's seat 8 is provided in a rotatable manner between the state facing the front direction of the vehicle body to allow operation of loader 3 by manipulating steering handle 9 and loader lever 10, and the state facing the rear direction of the vehicle body to allow operation of backhoe 5 by manipulating backhoe lever 11. Steering handle 9 is provided to allow operation of at least front wheel 7a or rear wheel 7b. Loader lever 10 is provided to allow loader 3 to be operated. Backhoe lever 11 is provided to allow backhoe 5 to be operated.

Outrigger 14 is provided so as to support backhoe loader 1 by forming contact with ground G during usage of backhoe 5. Exhaust pipe 15 is provided to allow discharge of exhaust gas from engine 4.

Foot mount member 20 is attached to the outer side of loader arm 31 in plan view. Foot mount member 20 is to be provided at at least one of loader arms 31 constituting a pair. Foot mount member 20 includes a foot mount section 20a. Foot mount member 20 is provided to be horizontal relative to horizontal ground G in a state where a bottom 32a of loader bucket 32 is in contact with ground G. Foot mount member 20 has an irregular section. Foot mount member 20 achieves an anti-skid effect by the irregularities of the irregular section.

Foot mount member 20 is located upper than a top face 6a of storage unit 6 (fuel tank 61 and battery box 62). Foot mount member 20 may be secured to loader arm 31 by welding, or by fastening with a bolt. Furthermore, foot mount member 20 may be secured by tightening a bolt to a sheet welded to loader arm 31. Foot mount member 20 is arranged to overlap with engine 4 in side view.

Figure 14:
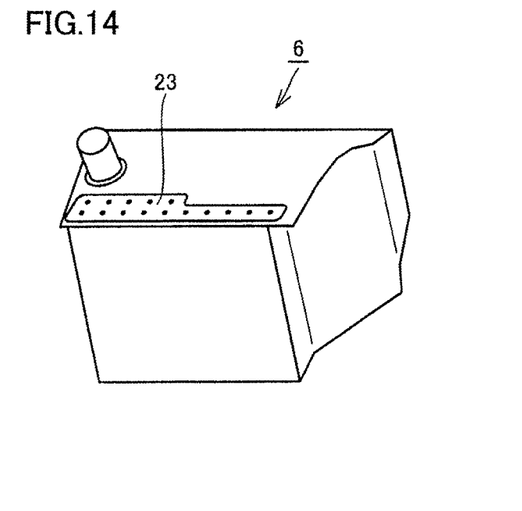
FIG. 14 is a perspective view schematically representing a storage unit having an anti-skid member provided at the backhoe loader according to an embodiment of the present invention.

Handle member 21 is attached to loader bucket cylinder 33 to overlap with foot mount member 20 vertically in side view. Foot mount member 20 and handle member 21 are to overlap each other in the vertical direction in plan view, not necessarily completely with each other, but at least partially. Handle member 21 is preferably arranged above loader bucket cylinder 33. This allows service worker 100 to maintain his/her posture at the side of engine 4 easier. Handle member 21 is arranged to overlap with engine 4 in side view. Fixture 22 attaches foot mount member 20 to loader arm 31. Anti-skid member 23 is provided at the top face of storage unit 6 (fuel tank 61 and battery box 62) (refer to FIG. 14).

Figure 4:
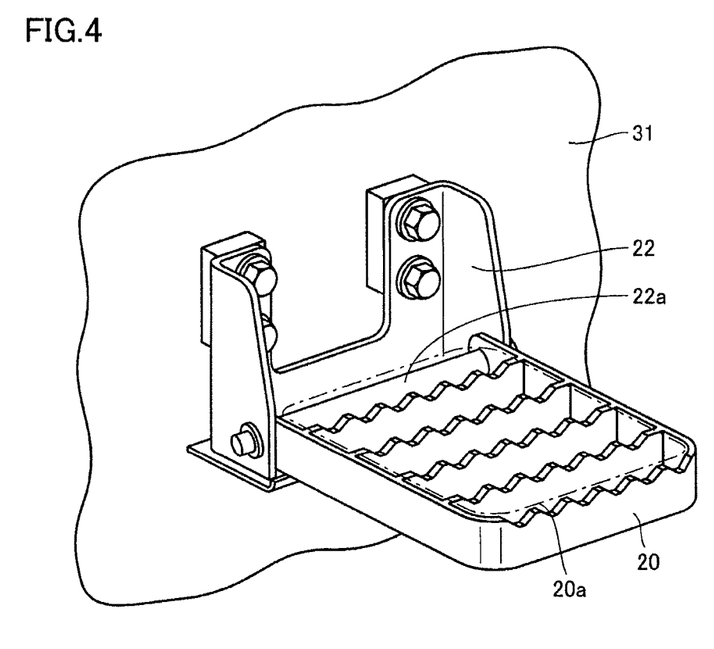
FIG. 4 is an enlarged perspective view schematically representing a foot mount member of the backhoe loader according to an embodiment of the present invention.
Figure 5:
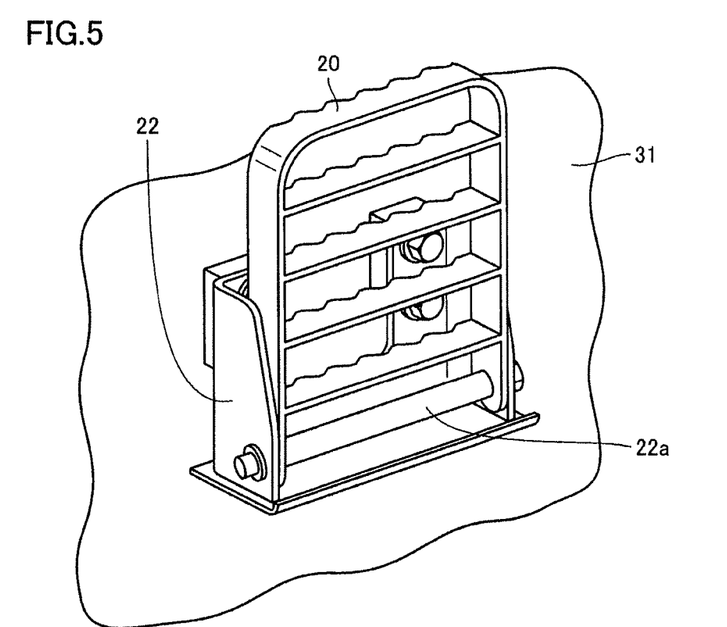
FIG. 5 is an enlarged perspective view schematically representing the state of the foot mount member of the backhoe loader pivoted to be arranged along the loader arm according to an embodiment of the present invention.

The structure of foot mount member 20 of backhoe loader 1 according to the present embodiment will be described in detail hereinafter. Referring to FIGS. 4 and 5, foot mount member 20 is arranged in a foldable manner in the present embodiment. Fixture 22 is secured to loader arm 31. Fixture 22 has a pivot spindle 22a. Pivot spindle 22a is inserted to pass through a through hole provided at the base end of foot mount member 20. Accordingly, foot mount member 20 is supported by fixture 22 to pivot around pivot spindle 22a.

Foot mount member 20 is attached to pivot between an unfolded state as shown in FIG. 4 and a folded state retained along loader arm 31 as shown in FIG. 5. During maintenance service of engine 4, foot mount member 20 is unfolded as shown in FIG. 4. The service worker can place his/her foot on foot mount member 20 to service engine 4. During usage of backhoe loader 1, foot mount member 20 is retained along loader arm 31, as shown in FIG. 5. Accordingly, the area of foot mount member 20 protruding sideward during usage of backhoe loader 1 can be reduced.

Figure 6:
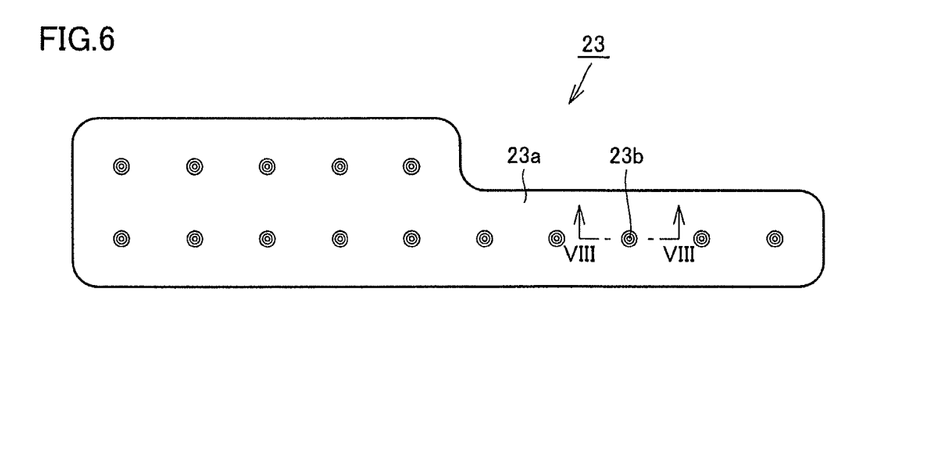
FIG. 6 is an enlarged top view schematically representing an anti-skid member of the backhoe loader according to an embodiment of the present invention.
Figure 7:
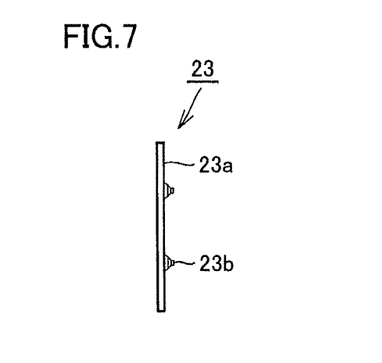
FIG. 7 is an enlarged side view schematically representing the anti-skid member of the backhoe loader according to an embodiment of the present invention.
Figure 8:
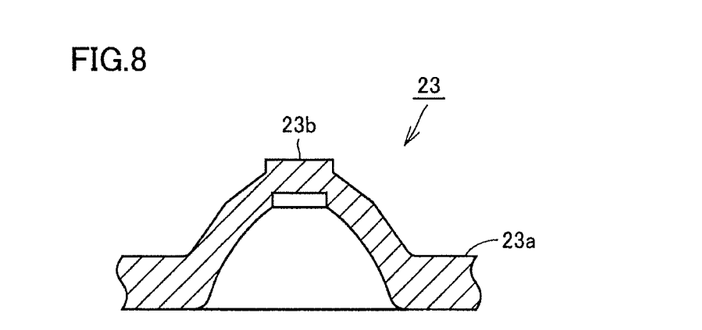
FIG. 8 is a sectional view taken along line VIII-VIII of FIG. 6.

The structure of anti-skid member 23 of backhoe loader 1 of the present embodiment will be described in detail hereinafter. Referring to FIGS. 6-8, anti-skid member 23 includes a flat plate 23a, and a plurality of projections 23b provided at the surface of flat plate 23a. The bumps of projections 23b provide the anti-skid effect.

Figure 9:
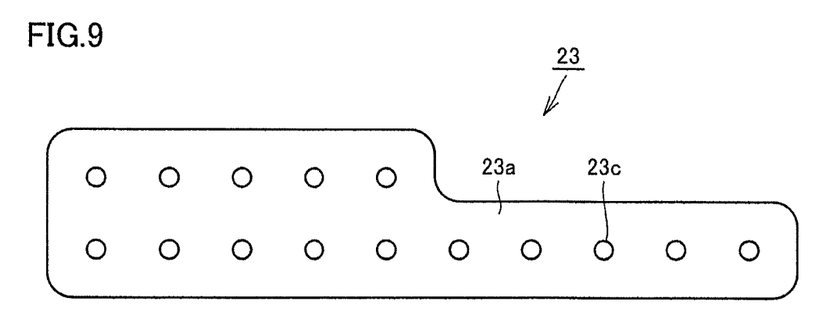
FIG. 9 is an enlarged top view schematically representing a modification of the anti-skid member according to an embodiment of the present invention.
Figure 10:
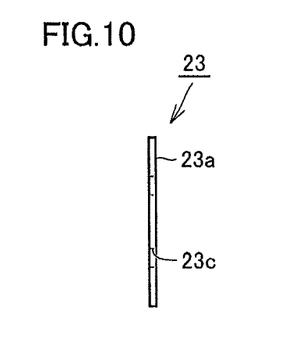
FIG. 10 is an enlarged side view schematically representing an anti-skid member of the backhoe loader according to an embodiment of the present invention.

Anti-skid member 23 is not limited to the structure set forth above. An arbitrary structure exhibiting an anti-skid effect may be employed. Referring to FIGS. 9 and 10 representing a modification of anti-skid member 23, a through hole 23c is provided at flat plate 23a. The edge of through hole 23c exhibits an anti-skid effect. As another modification of anti-skid member 23, a sandpaper structure may be provided at the surface. Furthermore, a combination of the structure set forth above may be employed for anti-skid member 23. In addition, anti-skid member 23 may be attached to the top face of storage unit 6.

Figure 11:
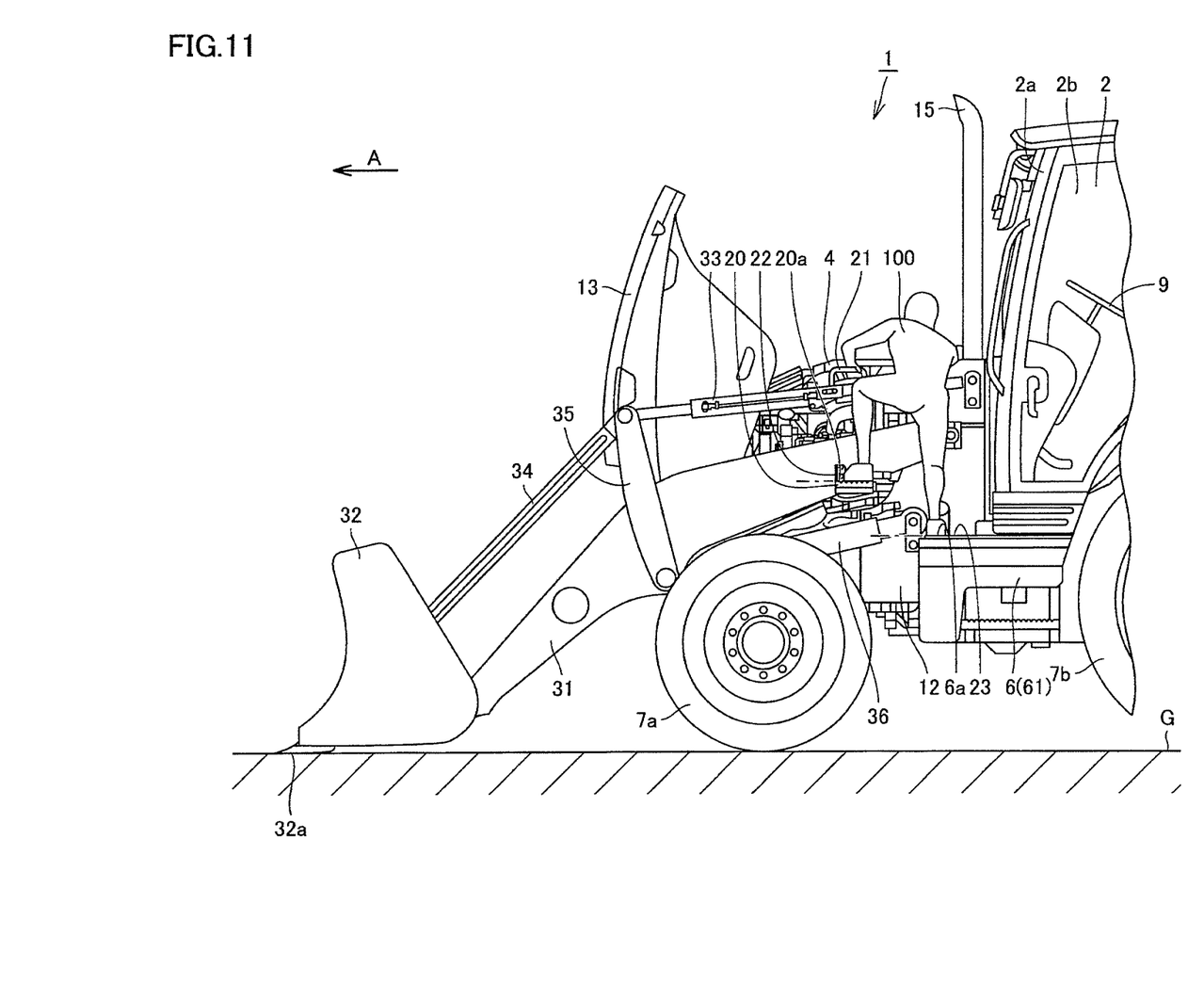
FIG. 11 is a side view schematically representing the manner of engine service at the backhoe loader according to an embodiment of the present invention.
Figure 12:
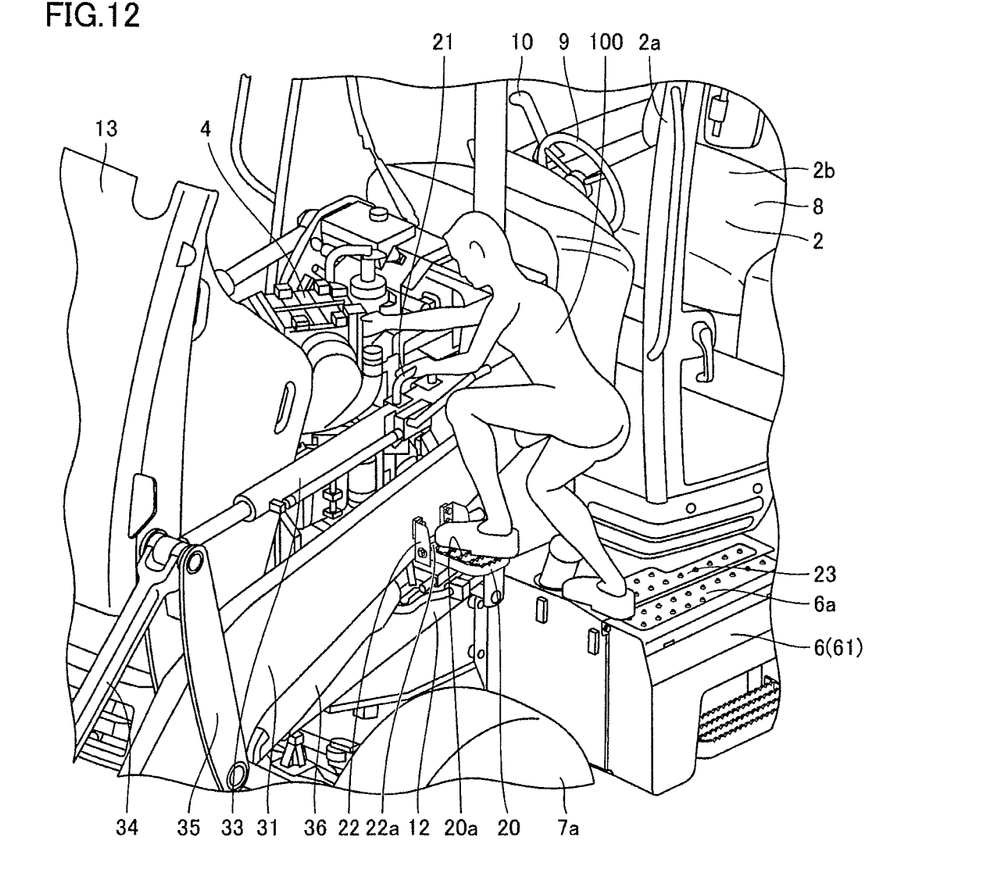
FIG. 12 is a perspective view schematically representing the manner of engine service at the backhoe loader according to an embodiment of the present invention.

The manner of servicing engine 4 of backhoe loader 1 in the present embodiment will be described hereinafter. Referring to FIGS. 11 and 12, service worker 100 places his/her right foot on storage unit 6 (fuel tank 61) and his/her left foot on foot mount section 20a of foot mount member 20. Service worker 100 grasps handle member 21 with his/her left hand. Service worker 100 uses his/her right hand to conduct maintenance of engine 4. In other words, engine 4 is being serviced with service worker 100 grasping handle member 21 with storage unit 6 (fuel tank 61) and foot mount member 20 as the foothold. In this state, service worker 100 is supported at the three points of storage unit 6 (fuel tank 61), foot mount member 20, and handle member 21.

Referring mainly to FIG. 11, foot mount section 20a is horizontal relative to horizontal ground G in a state where bottom 32a of loader bucket 32 is in contact with ground G. In this state, the left foot of service worker 100 is placed on foot mount section 20a. Therefore, the left foot of service worker 100 is located horizontally relative to foot mount section 20a.

Foot mount member 20 and handle member 21 are arranged to overlap vertically in side view. Accordingly, the position of the left foot and the position of the left hand of service worker 100 overlap vertically in side view. Foot mount section 20a is located upper than top face 6a of storage unit 6 (fuel tank 61). Therefore, the left foot of service worker 100 is located upper than the right foot. In this state, service worker 100 can step on with his/her left foot firmly on foot mount section 20a.

Although the above description is based on the case where engine 4 is serviced from the left side of backhoe loader 1 by service worker 100, engine 4 is also serviced from the right side of backhoe loader 1 by service worker 100. In this case, the left foot of service worker 100 is placed on storage unit 6 (battery box 62) and the right foot of service worker 100 is placed on foot mount section 20a of foot mount member 20. Handle member 21 is grasped by the right hand of service worker 100. Engine 4 is serviced with the left hand of service worker 100. The remaining elements are similar to those set forth above.

An operation of backhoe loader 1 of the present embodiment will be described hereinafter.

Referring FIGS. 1-3 again, backhoe loader 1 of the present embodiment is generally used for excavating and hauling work. Loader 3 is mainly used for hauling whereas backhoe 5 is used for both excavating and hauling.

When loader 3 is in operation, backhoe loader 1 moves forward with loader bucket 32 facing the front, and the leading end of loader bucket 32 is driven into the object of interest. At this stage, loader bucket cylinder 33 is operated to cause loader bucket 32 to rotate, whereby the object of interest is scooped into loader bucket 32. Then, lift cylinder 36 is operated with the object of interest scooped up in loader bucket 32 to cause loader arm 31 to rise, which in turn causes loader bucket 32 to rise. Subsequently, at a location in proximity to a platform or the like, loader bucket cylinder 33 is operated to cause loader bucket 32 to pivot around in a direction opposite to the scooping direction, whereby the object of interest is loaded onto the platform or the like from loader bucket 32.

When backhoe 5 is in operation, boom 51 is lowered with the leading end of backhoe bucket 53 facing the direction of the object of interest, and the leading end of backhoe bucket 53 digs into the object of interest. At this stage, arm cylinder 55 is operated to draw arm 52 towards boom 51. Backhoe bucket cylinder 56 is operated to cause backhoe bucket 53 to dig up, whereby the object of interest is excavated by backhoe bucket 53. Then, boom cylinder 54 is operated with the object of interest scooped in backhoe bucket 53 by the excavation to cause boom 51 to rise, which in turn causes backhoe bucket 53 to rise. Then, at a location in proximity to a platform or the like, backhoe bucket cylinder 56 is operated to cause backhoe bucket 53 to dump in a direction opposite to the digging direction. Thus, the object of interest is loaded on the platform or the like out from backhoe bucket 53.

Figure 13:
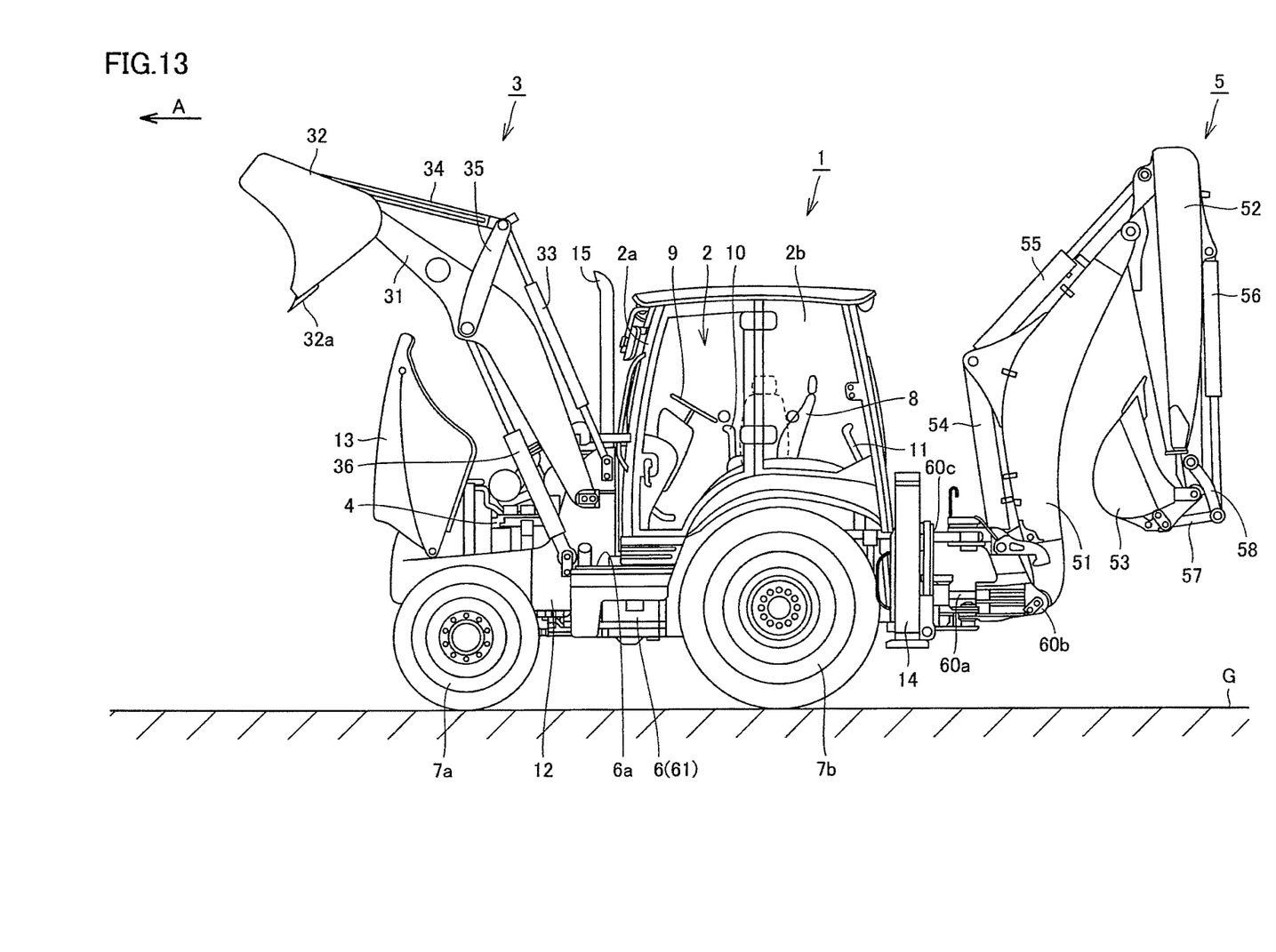
FIG. 13 is a side view schematically representing a state where the loader of the backhoe loader of a comparative example is moved upwards.

The functional advantage of backhoe loader 1 of the present embodiment will be described in comparison with a comparative example. Referring to FIG. 13, a backhoe loader 1 of a comparative example is absent of foot mount member 20 and handle member 21, as compared to backhoe loader 1 of the present embodiment. Backhoe loader 1 of the comparative example is inconvenient in that access to engine 4 is disturbed by loader arms 31 when they are at a lowered state. In other words, the maintenance service of engine 4 is impeded by loader arms 31. It is therefore difficult to service engine 4 beyond loader arms 31. As such, engine 4 will serviced with loader arms 31 raised. Thus, the job of servicing engine 4 is troublesome since engine 4 must be started before the maintenance service of engine 4 in order to move loader arms 31 upwards.

In contrast, backhoe loader 1 of the present embodiment allows service worker 100 to service engine 4 with foot mount member 20 as the foothold. In other words, engine 4 can be serviced without having to move loader arms 31 upwards. It is therefore not necessary to start the engine for the purpose of moving the loader arms upwards prior to the maintenance of engine 4. Accordingly, the workability in the maintenance of engine 4 is rendered favorable. Furthermore, service worker 100 is stable in posture since service worker 100 can place his/her foot horizontally on foot mount member 20 during servicing of engine 4. Since service worker 100 can inspect engine 4 in a stable posture, the workability of servicing engine 4 is rendered favorable.

Since backhoe loader 1 includes a storage unit 6 and handle member 21, service worker 100 can hold handle member 21 while servicing engine 4 with storage unit 6 and foot mount member 20 as the foothold. Thus, service worker 100 can place one foot and the other foot on each of storage unit 6 and foot mount member 20, and also grasp handle member 21 with one hand, allowing engine 4 to be serviced under a stable state supported at three points.

Handle member 21 is attached to loader bucket cylinder 33 so as to overlap with foot mount member 20 vertically in side view. Accordingly, service worker 100 can set the foot position and the hand position in an overlapping manner vertically in side view, such that the posture of service worker 100 is stabilized. Thus, service worker 100 can service engine 4 under a stable state. Since service worker 100 can inspect engine 4 in a stable posture, the workability of servicing engine 4 is rendered favorable.

Moreover, foot mount section 20a is located higher than top face 6a of storage unit 6. Accordingly, service worker 100 can stand firmly by means of foot mount section 20a to stabilize his/her posture.

Foot mount member 20 is supported by fixture 22 in a pivotable manner around pivot spindle 22a. Accordingly, foot mount member 20 can be pivoted around pivot spindle 22a. Since foot mount member 20 can be configured in a foldable manner, the area of foot mount member 20 protruding sideward during the operation of the backhoe loader can be reduced.

Storage unit 6 includes fuel tank 61. Therefore, fuel tank 61 can be used as a foothold.

Further, storage unit 6 includes hydraulic oil tank 63. Therefore, hydraulic oil tank 63 can be used as a foothold.

Furthermore, storage unit 6 includes a battery box 62. Accordingly, battery box 62 can be used as a foothold.

Although the above description is based on the case where foot mount member 20 is provided at both the left and right sides of backhoe loader 1, foot mount member 20 may be provided at only the right side or left side of backhoe loader 1.

Furthermore, although the above description is based on the case where fuel tank 61 and battery box 62 are applied as storage unit 6, hydraulic oil tank 63 or the like may be employed instead. As shown in FIG. 3, hydraulic oil tank 63 may be arranged at the inner side of battery box 62.

It should be understood that the embodiments disclosed herein are illustrative and non-restrictive in every respect. The scope of the present invention is defined by the terms of the claims, rather than the description above, and is intended to include any modification within the scope and meaning equivalent to the terms of the claims.

INDUSTRIAL APPLICABILITY

The present invention is particularly advantageously applied to a backhoe loader including a loader arranged frontward of a cab, and a backhoe arranged rearward of the cab.

REFERENCE SIGNS LIST 1 backhoe loader, 2 cab, 3 loader, 4 engine, 5 backhoe, 6 storage unit, 6a top face, 7a front wheel, 7b rear wheel, 8 operator's seat, 9 steering handle, 10 loader lever, 11 backhoe lever, 12 frame, 13 bonnet, 14 outrigger, 15 exhaust pipe, 20 foot mount member, 21 handle member, 22 fixture, 22a pivot spindle, 23 anti-skid member, 31 loader arm, 32 loader bucket, 32a bottom, 33 loader bucket cylinder, 34 loader rod, 35 loader tilt arm, 36 lift cylinder, 51 boom, 52 arm, 53 backhoe bucket, 54 boom cylinder, 55 arm cylinder, 56 backhoe bucket cylinder, 57 first link, 58 second link, 60a swing cylinder, 60b swing bracket, 60c slide bracket, 61 fuel tank, 62 battery box, 63 hydraulic oil tank, 100 service worker.

The invention claimed is:

1. A backhoe loader comprising a cab, a loader and an engine arranged forward of said cab, and a backhoe arranged rearward of said cab, said loader including a pair of loader arms sandwiching said engine from a side, a loader bucket provided at leading ends of said loader arms, and a loader bucket cylinder operating said loader bucket, said backhoe loader comprising a foot mount member attached directly to an outer side of one of said loader arms to be horizontal relative to a ground in a state where a bottom of said loader bucket is in contact with the ground.

2. The backhoe loader according to claim 1, comprising:

a storage unit jutting out more sideward than said loader arm in plan view, and extending more forward than said cab, and a handle member attached directly on said loader bucket cylinder vertically above said foot mount member in side view.

3. The backhoe loader according to claim 2, wherein said foot mount member is located higher off the ground than a top face of said storage unit.

4. The backhoe loader according to claim 1, further comprising a fixture fastened to said loader arm and having a pivot spindle, wherein said foot mount member is supported by said fixture in a pivotable manner around said pivot spindle.

5. The backhoe loader according to claim 2, wherein said storage unit includes a fuel tank.

6. The backhoe loader according to claim 2, wherein said storage unit includes a working oil tank.

7. The backhoe loader according to claim 2, wherein said storage unit includes a battery box.

* * * * *